(12) United States Patent
Socolsky et al.

(10) Patent No.: US 10,420,294 B2
(45) Date of Patent: Sep. 24, 2019

(54) VALVE APPARATUS

(71) Applicant: Netafim, Ltd., Tel Aviv (IL)

(72) Inventors: Esteban Socolsky, Kibbutz Hatzerim (IL); Gad Peleg, Kibbutz Hulda (IL); Ehud Feintuch, Kfar Retamim (IL)

(73) Assignee: Netafim, Ltd., Tel Aviv (IL)

( * ) Notice: Subject to any disclaimer, the term of this patent is extended or adjusted under 35 U.S.C. 154(b) by 336 days.

(21) Appl. No.: 15/036,947

(22) PCT Filed: Oct. 29, 2014

(86) PCT No.: PCT/IB2014/065681
§ 371 (c)(1),
(2) Date: May 16, 2016

(87) PCT Pub. No.: WO2015/071797
PCT Pub. Date: May 21, 2015

(65) Prior Publication Data
US 2016/0286744 A1  Oct. 6, 2016

Related U.S. Application Data (60) Provisional application No. 61/905,236, filed on Nov. 17, 2013.

(51) Int. Cl.
*A01G 25/16* (2006.01)
*A01G 25/02* (2006.01)
(Continued)

(52) U.S. Cl.
CPC ........ *A01G 25/162* (2013.01); *A01G 25/02* (2013.01); *F16K 7/12* (2013.01); *F16K 21/04* (2013.01); *F16K 31/126* (2013.01)

(58) Field of Classification Search
CPC ........ A01G 25/162; A01G 25/02; F16K 7/17; F16K 21/04; F16K 31/126; F16K 31/1268; Y10T 137/7836
(Continued)

(56) References Cited

U.S. PATENT DOCUMENTS 2,360,321 A   10/1944   Griswold
3,964,685 A    6/1976   Chauvigne
(Continued)

FOREIGN PATENT DOCUMENTS

WO   WO 2012/131503   10/2012

OTHER PUBLICATIONS

International Search Report dated Jun. 24, 2015 in counterpart International (PCT) Application No. PCT/IB2014/065681.
(Continued)

*Primary Examiner* — Michael R Reid
(74) *Attorney, Agent, or Firm* — Womble Bond Dickinson (US) LLP (57) ABSTRACT

A valve assembly includes an inlet and an outlet, and has a first state where liquid is stopped from flowing from the inlet towards the outlet, a second state where liquid is released to flow from the inlet towards and out of the outlet, and a terminal state where after flowing out of the outlet, the liquid is stopped form flowing out of the outlet. An incoming command triggers the valve assembly from the first state towards the second state and, at or after reaching the terminal state, the valve assembly transmits an outgoing command.

10 Claims, 8 Drawing Sheets

(51) Int. Cl.
    *F16K 7/12* (2006.01)
    *F16K 21/04* (2006.01)
    *F16K 31/126* (2006.01)
(58) Field of Classification Search
    USPC .................. 239/106, 110, 542, 570–571, 66
    See application file for complete search history.

(56) References Cited

U.S. PATENT DOCUMENTS

| | | |
|---|---|---|
| 4,139,150 A | 2/1979 | Graversen et al. |
| 4,733,685 A * | 3/1988 | Bron .................... A01G 25/162 137/119.06 |
| 4,747,427 A | 5/1988 | Smith et al. |
| 5,535,778 A | 7/1996 | Zakai |
| 9,291,276 B2 | 3/2016 | Keren |

OTHER PUBLICATIONS

Written Opinion dated Jun. 24, 2015 in counterpart International (PCT) Application No. PCT/IB2014/065681.

* cited by examiner

VALVE APPARATUS

RELATED APPLICATIONS

This is a 35 USC 371 U.S. National Phase of International Application No. PCT/IB2014/065681, filed 29 Oct. 2014 and published in English as WO 2015/071797A1 on 21 May 2015, which claims priority to U.S. Provisional application No. 61/905,236, filed 17 Nov. 2013. The contents of the aforementioned applications are incorporated by reference in their entirety.

TECHNICAL FIELD

Embodiments of the present invention relate to a valve apparatus and to an irrigation system and method including a valve apparatus for controlling and/or affecting the flow of liquid through an irrigation system.

BACKGROUND

Valve apparatuses may be used in irrigation systems, while in some cases operation of such valves may be e.g. self controlled and in other cases e.g. controlled externally. Examples of valves used in irrigation systems may include valves for opening water in the system to reach or affect flow through a section of the system. For example in irrigation systems employing drip irrigation lines, such valves may be used for allowing liquid to flow through the drip lines of the system. Other examples may include flushing valves that are installed at the end of the drip lines for affecting flushing of the lines at e.g. the beginning of an irrigation cycle.

U.S. Pat. No. 5,535,778, the disclosure of which is incorporated herein by reference, is an example of a self-closing valve that is used for flushing irrigation lines. This valve has an inlet portion that communicates with water of an irrigation line, and an elastic membrane that divides an enclosed space in the valve into upstream and downstream compartments. The valve has a passage between the compartments and a discharge opening in the upstream compartment. Flow of water from the upstream compartment flowing into the downstream compartment flexes the membrane in the upstream direction until it closes against the discharge opening to end flushing and remain closed as long as it is exposed to upstream pressurized water from the irrigation line. Upon drop and cessation of the upstream pressure, the membrane will return to its un-flexed state and the valve will be ready for a subsequent flushing action that will begin when exposed again to an upstream pressurized water in the irrigation line.

WO2012131503, the disclosure of which is incorporated herein by reference, is an example of an eternally controlled valve that has a liquid passage, a sealing diaphragm and a control port that can receive pressurized control signals. The sealing diaphragm is adapted to seal the passage, where upon receipt of a control signal the sealing diaphragm bends and opens a path for liquid around the sealing diaphragm that can flow downstream. Cessation of the control signal will allow the valve to return back to a close state where pressurized liquid upstream is stopped from flowing downstream.

In irrigation systems employing a plurality of valves, each controlling liquid flow into and/or out of a section of the system, variance in the liquid flow rate through the system may depend on the amount of valves that are activated to open during the same period of time. The larger the number of valves that open simultaneously the larger the variance in flow rate that the system must be designed to support.

SUMMARY

The following embodiments and aspects thereof are described and illustrated in conjunction with systems, tools and methods which are meant to be exemplary and illustrative, not limiting in scope.

In accordance with one aspect of the present invention there is provided an embodiment of a valve apparatus comprising an inlet and an outlet. The apparatus comprising a first state where liquid is stopped from flowing from the inlet towards the outlet, a second state where liquid is released to flow from the inlet towards and out of the outlet, and a terminal state that is different from the first state where after flowing out of the outlet the liquid is stopped form flowing out of the outlet.

In accordance with the embodiments of the present invention, an incoming command triggers the apparatus from the first state towards the second state and at or after the terminal state the apparatus transmits an outgoing command out of the apparatus.

Embodiments of apparatuses of the present invention may be used with various types of irrigation devices, preferably drip irrigation lines, for affecting flow, preferably flushing (but not only) of devices of an irrigation system including such apparatuses—in a "leaping manner" manner. By "leaping" activation of flow through an irrigation system each time to a different section or device of the system, better control of where and when liquid flows through the system may be provided, possibly also reducing costs associated with operation and design of such irrigation systems.

In an embodiment, the incoming and outgoing commands are preferably fluid aid/or liquid pressure. The outgoing command may me self formed and may be a result or formed in response to pressurized liquid from upstream. Possibly the outgoing command may also be formed by some of the pressurized liquid from upstream that is diverted to form the outgoing command. Possibly the incoming command of one embodiment of an apparatus may be the outgoing command of another (or similar) embodiment of an apparatus.

In accordance with one form of the present invention there is also provided an irrigation system comprising at least two first and second valve apparatuses according to embodiments of the present invention. Each apparatus being adapted to open in response to an incoming command and subsequently close and transmit an outgoing command, wherein an outgoing command of the first apparatus forms the incoming command of the second apparatus.

In accordance with one form of the present invention there is also provided a method of irrigating comprising providing an irrigation system comprising a plurality of valve apparatuses according to embodiments of the present invention. Each apparatus being associated to a given different section of the system being e.g. simply a single irrigation device or a plurality of devices, with such devices being preferably drip irrigation lines. The apparatuses in one embodiment may affect flow through a given section, where each section may be affected to have a first flow rate when an apparatus associated therewith is closed and a second larger flow rate when an apparatus associated therewith is open. Such first flow rate may possible be a flow rate when e.g. a drip irrigation cycle is performed through a device or devices of sections of a system and the second flow rate when e.g. flushing of the device or devices of sections of the system is activated.

In accordance with one aspect of the present invention, a maximum increase in overall flow rate flowing through the system measured during a time span allowing at least most sections in the system to experience their second flow rate is less than the sum of all the second flow rates of the at least most sections. Possibly, this maximum increase in overall flow rate may be as low as a flow rate of one section (or one irrigation device, preferably one drip irrigation line) of the system experiencing its second flow rate thus considerably reducing operational costs associated to such system in relation to a conventional system where all devices may be activated to operate at the same instance, and thus require e.g. larger capacity pumps for providing pressurized liquid to the system. Preferably, measurement of such flow rate is performed at a location of the system via which all liquid flowing to the sections of the system being considered must flow.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figures 1A, 1B:
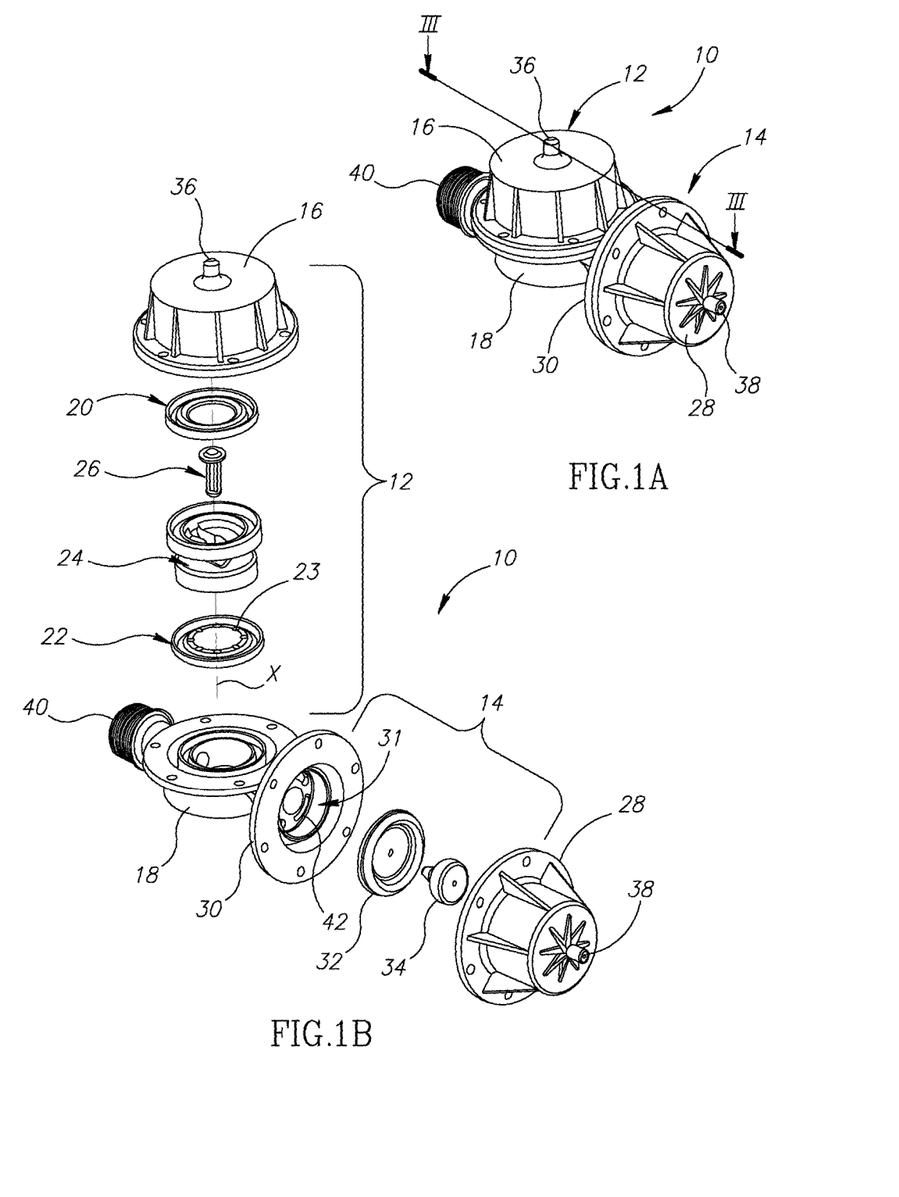
FIG. 1A schematically shows a valve apparatus in accordance with an embodiment of the present invention.
FIG. 1B schematically shows an exploded view of the valve apparatus of FIG. 1A.

Attention is first drawn to FIGS. 1A and 1B showing, respectively; assembled and exploded conditions of an embodiment of a valve apparatus 110 of the present invention. Apparatus 10 includes first and second valve members 12, 14. First valve member 12 has upper and lower housings 16, 18 that enclose an upper membrane 20, a lower membrane 22, a support 24 and an actuating pin 26 of the first valve member. In an embodiment, each one of the upper membrane 20 and lower membrane 22 may extend generally perpendicular along at least portions thereof to an axis X about which it is formed, and lower membrane 22 may include a plurality of through going apertures 23 distributed about the axis. The second valve member 14 has upstream and downstream housings 28, 30 that enclose a partition membrane 32 and a flow device 34 of the second valve member. Partition membrane 32 divides the interior of the second valve member into first and second chambers 31, 33 (only first chamber 31 is visible in FIG. 1B). Housings 16, 18, 28, 30 form a continuous outer casing for the first and second valve members 12, 14 so as to provide a one piece integral functioning apparatus 10 when same is in an assembled state.

Also seen in these figures are inlet and outlet ports 36, 38 of the apparatus. Inlet port 36 is formed in upper housing 16 and directly communicates between an interior volume of the first valve member above upper membrane 20 and the exterior of the first valve member. Outlet port 38 is formed in upstream housing 28 and communicates between second chamber 33 (visible in FIGS. 3A to 3C) and the exterior of the second valve member. Yet further seen in these figures are an inlet 40 and an outlet 42 of the valve apparatus. Inlet 40 communicates between apparatus 10 and an upstream fluid source (not seen) and outlet 42 is formed in second valve member 14 to provide a possible path out of the first chamber 31 of member 14 for fluid flowing through the apparatus. As seen in FIG. 1B, outlet 42 in this embodiment may take the form of a series of arced shaped openings.

It should be noted that directional terms appearing throughout the specification and claims, such as "forward", "rear", "up", "down", "downstream", "upstream", etc., (and derivatives thereof) are for illustrative purposes only, and are not intended to limit the scope of the appended claims. In addition it is noted that the directional terms "down", "below" and "lower" (and derivatives thereof) define identical directions.

Figure 2:
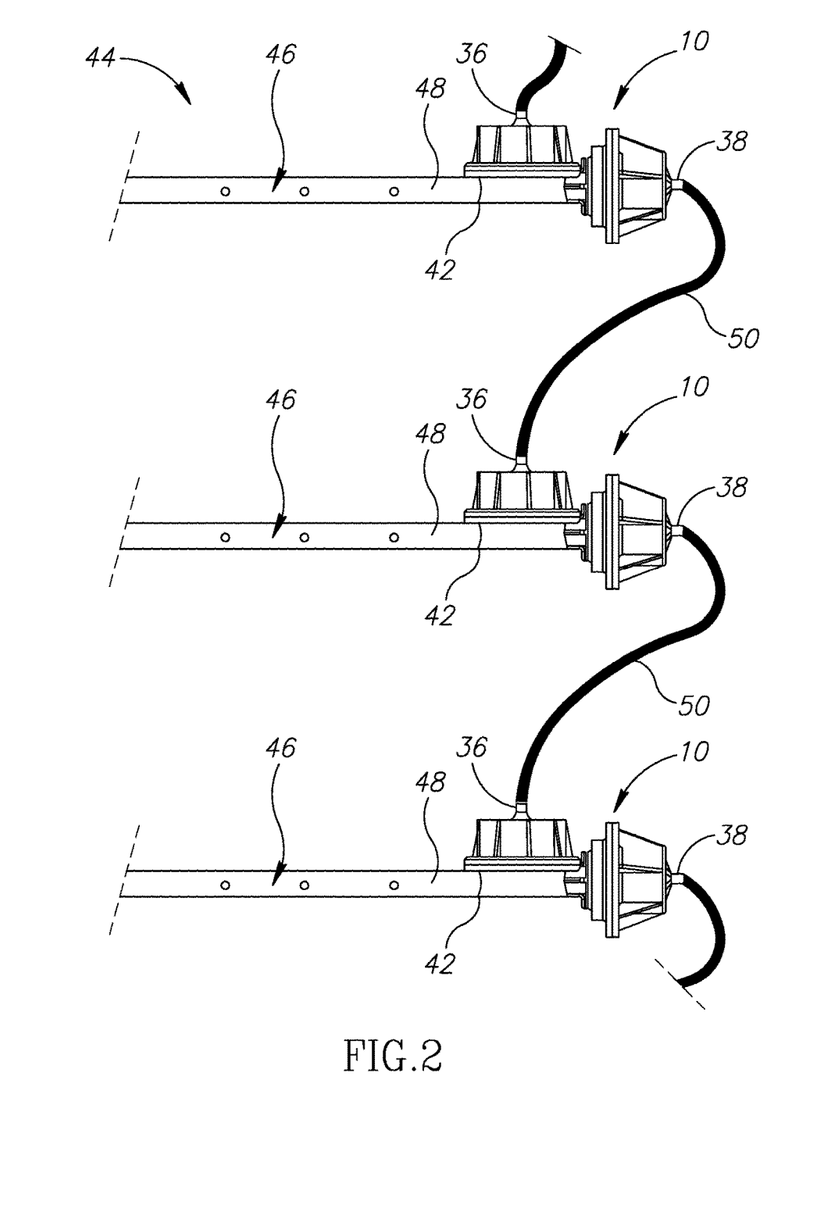
FIG. 2 schematically shows a possible form of an irrigation system including valve apparatuses in accordance with an embodiment of the present invention.

Attention is drawn to FIG. 2. In one form of the present invention, possible embodiments of valve apparatus 10 may be used in an irrigation system 44 for controlling and/or affecting flow through the system. System 44, here embodied comprising a plurality of drip irrigation lines 46, possibly includes an apparatus 10 at or adjacent an end 48 of each line 46, for possibly effecting here flushing of the lines. Each apparatus 10 may be connected to an adjacent apparatus 110 (of an adjacent line 46) by a command line 50 that communicates between an outlet port 38 of one apparatus 10 and an inlet port 36 of an adjacent apparatus 10.

Figure 3A:
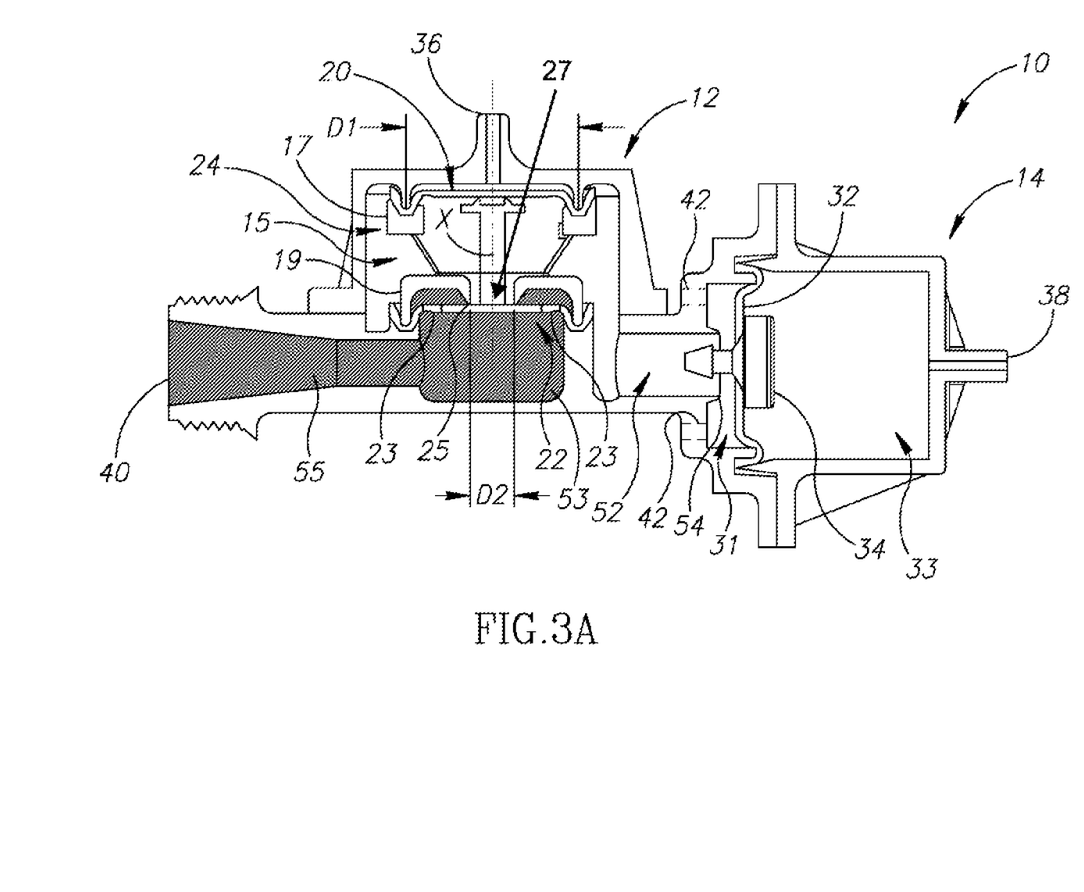
FIGS. 3A to 3C schematically show cross sectional views of the valve apparatus of FIGS. 1A and 1B taken, in plane III-III indicated in FIG. 1A, and showing different states of operation of the valve.

Attention is drawn to FIG. 3A showing a possible initial first state of one embodiment of apparatus 10 that may be present prior to start of use of the apparatus and possibly also prior to connection of apparatus 10 to an upstream fluid source (such as the drip lines of system 44). In FIG. 3A support 24 is seen including upper and lower segments 17, 19 separated at least partially in the cross section here seen by an intermediate volume 15. Membrane 22 is fixed at its periphery between lower housing 18 and segment 19, and membrane 20 is fixed at its periphery having a diameter D1 between upper housing 16 and segment 17.

Membrane 22 extends below segment 19 with a central filled portion thereof, at a relaxed state of the membrane, possibly pressed against a downwardly projecting peripheral raised rim 25 of the segment having a diameter D2 substantially smaller than D1. The apertures 23 of membrane 22 when e.g. viewed along axis X are located radially beyond rim 25 in a direction away from axis X. A bore 27 of segment 19 extends through the segment opening upwards into intermediate volume 15 and downwards via rim 25 into a cavity 53 below segment 19 that is in fluid communication with inlet 40 via a channel 55. Actuating pin 26 extends within intermediate volume 15 along axis X between the membranes 20 and 22. A lower, possibly cylindrical, end of pin 26 is located in bore 27 at or adjacent membrane 22; and an upper, possibly disk shaped, wider end of pin 26 is located at Or adjacent membrane 20. Inlet port 36 opens into the first valve member 12 into a volume above membrane 20 having a lateral width (away from axis X) defined by dimension D1, and possibly the opening of inlet port 36 into this volume is generally above pin 26.

Intermediate volume 15 is in fluid downstream communication, via an entry 52 of apparatus 10, into the second valve member 14. In valve member 14, partition membrane 32 is fixed at its periphery between the upstream and downstream housings of member 14, dividing accordingly the interior of member 14 into the first and second chambers 31, 33. Entry 52 opens into first chamber 31 via a raised peripheral ridge 54 that projects into chamber 31. Flow device 34 extends through an aperture in membrane 32 to provide fluid communicate between the first and second chambers of valve member 14.

The embodiment of apparatus 10 seen in FIG. 3A may also illustrate an initial first possible state of apparatus 10 when first put into fluid communication with an upstream fluid source. The gray shaded color in channel 55, cavity 53 and the area above membrane 22 (radially outside of rim 25); represents where liquid may be present after connecting apparatus 10 to an upstream liquid source. It is noted that liquid reaches the area above membrane 22 via apertures 23, and this liquid is sealed from flowing onwards downstream via bore 27 by membrane 22 being sealingly seated and pressed against rim 25. In this position it is noted that only an effective portion of membrane 22 defined by diameter D2 is exposed to a pressure difference between cavity 53 and the area above membrane 22 confined by rim 25 (since the pressurized liquid in cavity 53 is also present in the area above membrane 22 outside rim 25).

Figure 3B:
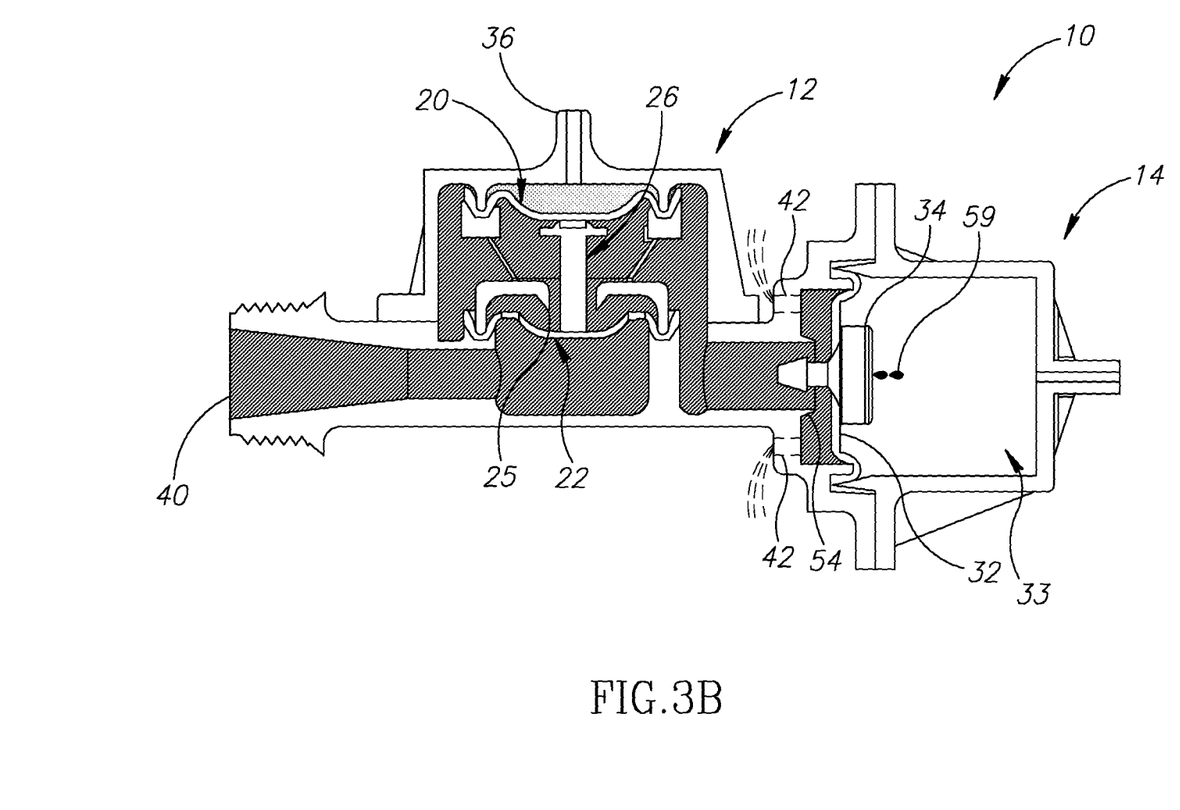

Attention is now drawn to FIG. 3B to illustrate a second possible state of an embodiment of apparatus 10 that may be assumed after receiving an incoming command via inlet port 36. The incoming command is here illustrated by the lighter gray shaded color seen in inlet port 36 and above upper membrane 20. The incoming command, possibly accomplished by pressurized fluid and/or liquid, urges upper membrane 20 to flex downwards and bias actuating pin 26 downwards too. The downwardly moving pin 36 urges lower membrane 22 consequently to also move downwards and lift off from its sealing engagement with rim 25; and by that release liquid to flow via bore 27 downstream. The liquid flowing downstream passes via intermediate volume 15 and entry 52 into chamber 31 and from there it is here flushed out of apparatus 19 via outlet(s) 42.

In embodiments where the incoming command is a pressurized command, the urging downwards by such incoming command of: membrane 20, pin 36 and membrane 22; may be assisted by the effective area of membrane 20 being exposed to this command being larger (i.e. with a larger lateral width D1) in relation to the effective area of membrane 22 exposed to pressure in cavity 53 (i.e. with a smaller lateral width D2). By provision of this difference in effective areas exposed to pressure, an incoming command bearing against membrane 20 from above and having a pressure substantially similar (or even slightly smaller) than the pressure in cavity 53—may overcome the pressure in cavity 53 to urge membrane 20, pin 36 and membrane 22 downwards to open a passage downstream via bore 27.

At least part of the liquid flowing towards the outlet of apparatus 10 is diverted by flow device 34 to flow into chamber 33. This diverted liquid is indicated in FIG. 3B by drops 59 that illustrate a possible low flow rate of such diverted liquid. As flushing of liquid out of apparatus 10 continues, the amount of liquid diverted into chamber 33 gradually increases thus resulting also (at least at some point) in a gradual rise of pressure in chamber 33, which affects membrane 32 to flex towards ridge 54.

Figure 3C:
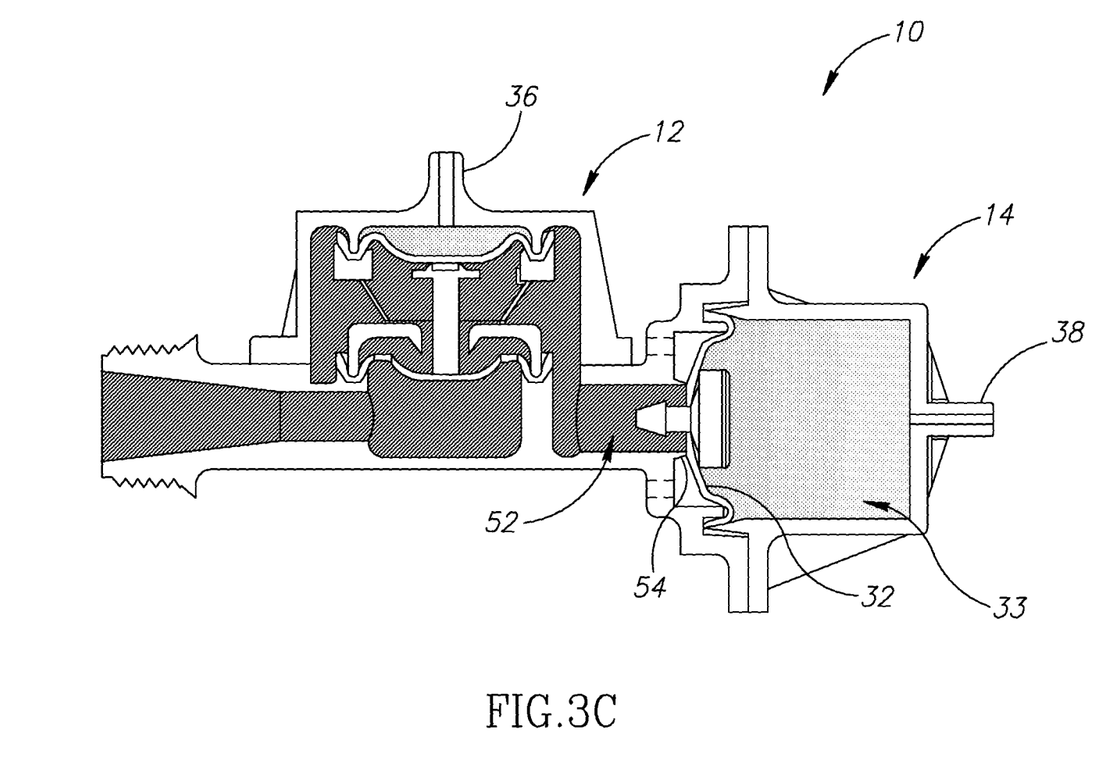

Attention is drawn to FIG. 3C to show a possible third terminal state that apparatus 10 may assume at or after membrane 32 flexed to be seated on ridge 54. At the terminal state seen here, the seated position of membrane 32 on ridge 54 seals liquid from flowing onwards downstream out of entry 52, consequently terminating the here flushing of liquid out of apparatus 10. Chamber 33, at the state of apparatus 10 here seen, is illustrated by the gray shaded color as being filled with liquid and/or at a pressure level substantially equal to that which is present on the opposite side of membrane 32 in entry 52.

In one form of the present invention, the pressure in chamber 33 may be transmitted out of apparatus 10 via outlet port 38 and/or may substantially represent a pressure existing in chamber 33 and any means communicating fluid downstream from chamber 33 such as command line 50 seen in FIG. 2. With attention now drawn back to FIG. 2, one form of the present invention of "leaping" commands between embodiments of apparatuses 10 of the present invention will be discussed.

On start of an irrigation cycle, the drip lines of system 44 may be exposed to pressurized liquid from an upstream central source (not seen) that may include e.g. a pump for providing and/or forming the pressurized fluid. In a sequence of operation of one form of the present invention, the valve apparatuses 10 in system 44 may each be in an initial first state generally similar to that illustrated in FIG. 3A when first put into fluid communication with liquid arriving from the upstream central source.

Supplying an incoming command to e.g. the inlet port 36 of the uppermost apparatus 110 in FIG. 2, may trigger that apparatus 10 to shift from its initial first state towards a second state generally similar to that seen in FIG. 3B in which liquid is released to flow from the inlet 40 towards and out of the outlet 42. The first incoming command provided to this first uppermost apparatus 10 may be provided from any means such as an adjacent pipe (not shown) including e.g. a valve (also not shown) that may be activated to open and provide into inlet port 36 pressurized liquid constituting this first incoming command. In the second state, apparatus 10 facilitates a flushing action of the uppermost irrigation line 46 of system 44 that may terminate when that apparatus 10 reaches a terminal state generally similar to that illustrated in FIG. 3C.

The pressure in chamber 33 of the uppermost apparatus 10 may in accordance with one form of the present invention be transmitted via outlet port 38 and command line 50 to the inlet port 36 of the apparatus 10 illustrated below to trigger a subsequent flushing action of the irrigation line 46 associated with that apparatus. This "leaping" action may continue between all lines of the system each time shifting a flushing action to a subsequent line, until all lines have been flushed and an irrigation cycle of system 44 (devoid of flushing) may thereafter be performed.

Once an irrigation cycle has terminated and the building of pressure downstream into the lines 46 of system 44 has e.g. halted, the pressure in the lines 46 gradually decreases due to remaining liquid in the lines being emitted via the drip emitters to the outside. When the pressure in lines 46 is sufficiently low (possibly similar to that in the ambient environment), the liquid in the chambers 33 of the apparatuses 10 associated with these lines may gradually be released back upstream out of the chambers 33 via the devices 34, thus allowing each apparatus 10 to return to an initial state generally similar to that seen in FIG. 3A. A system 44 reaching this state is thus prepared for a subsequent start of an irrigation cycle where "leaping" of flushing between the lines 46 may again be performed upon activation of an incoming command into e.g. the uppermost first apparatus 10 seen at here the top of FIG. 2.

In a non-binding example, a system including an embodiment of valve apparatus 10 at e.g. the end of each line for performing e.g. flushing may function and/or operate in accordance with the following parameters. A flow rate of flow device 34 into chamber 33 may be between about 1 and about 12 liters per hour and a pressure of an incoming command entering inlet port 36 may be between about 0.5 and about 4 bars. A length of a command line 50 between adjacent valve apparatuses may be about 2 meters and for an embodiment of apparatus 10 having e.g. a flow device 34 with a flow rate of about 4 l/h—a time span of about 1 minute may lapse between start of flushing and a terminal state of the apparatus where flushing is terminated and/or where sufficient pressure is communicated to start a flushing action in a subsequent apparatus.

In accordance with one aspect of the present invention, embodiments of the valve apparatuses of the present invention, implemented in an irrigation system for performing e.g. flushing of their lines, may assist in reducing operational costs and/or energy requirements that may be associated with the system. An example of how this may be achieved may be seen in the following analysis.

In a first step of the analysis consider a drip irrigation line providing a liquid flow rate of about 400 liters/hour exiting its drip emitters to irrigate a field. This would result in an irrigation system including 100 such lines having an overall flow rate of about 40 cubic-meter/hour (i.e. 100 [lines]×400 [l/h]=40,000 [l/h]=40 [m$^3$/h]).

Now in a second step of the analysis consider that if flushing requires an increase of about 300 l/h per line, then in an irrigation system where all lines are flushed substantially at the same instance, an overall flow rate of the system during flushing may be required to reach about 70 cubic-meter/hour (i.e. 100 [lines]×(400 [l/h]+300 [l/h])=70,000 [l/h]=70 [m$^3$/h]).

This increase from about 40 cubic-meters/hour during irrigation to about 70 cubic-meters/hour during flushing, represents an increase of about 75% in a flow rate that the system should be able to support in order to ensure proper flushing of its drip lines. This increase may be translated to an increase of about 75% in the energy consumption of the irrigation system during flushing that e.g. a pump providing pressurized liquid to the system may be required to provide. Possibly also such an irrigation system may be designed to include larger diameter pipings for leading liquid towards the drip lines in order to support the increase in flow rate during flushing.

In an irrigation system implementing an embodiment of the present invention's valve apparatus at an end of e.g. each or some of its lines, such increase in flow rate during flushing may be substantially reduced. For example, consider joining the above analysis at its second step, however now in a scenario where an embodiment of a valve apparatus of the present invention is located at e.g. an end of each line.

In the second step according to this scenario, it will be assumed again that flushing of a single line requires an increase of about 300 l/h per line, however since now flushing may be performed in a 'leaping' sequence each time to a single line, such irrigation system may require an overall flow rate during flushing of only about 40.3 cubic-meter/hour (i.e. 100 [lines]×400 [l/h]+300 [l/h]=40,300 [l/h]=40.3 [m$^3$/h]). This increase from about 40 cubic-meters/hour during irrigation to about 40.3 cubic-meters/hour during flushing, represents an increase of less than about 1% in a flow rate that a system in accordance with such form of the present invention may be required to support in order to ensure proper flushing of its drip lines. Consequently, such a system may be designed to support only a slight increase in flow rate during flushing and thus include e.g. a pump suitable to support only a slight increase in energy consumption—thus reducing operational costs of the irrigation system.

Figure 4:
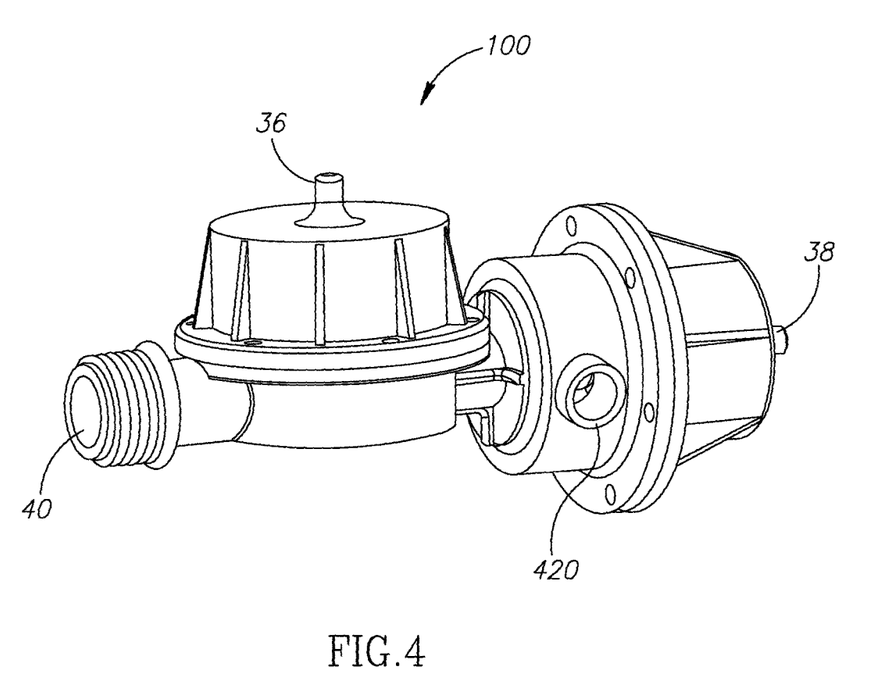
FIG. 4 schematically shows a valve apparatus in accordance with another embodiment of the present invention.

Attention is drawn to FIG. 4 illustrating an embodiment of an apparatus 100 of the present invention. Apparatus 100 is generally similar to apparatus 10 besides being provided with an outlet 420 that can be used to collect the liquid released to flow downstream in a second state of apparatus 100 that is generally similar to that seen in FIG. 3B. Outlet 420 may be used to collect flushed liquid when used in a system such as system 44 seen in FIG. 2 and with attention drawn to FIG. 5 one other possible form of using apparatuses 100 in an irrigation system 440 may be illustrated.

Figure 5:
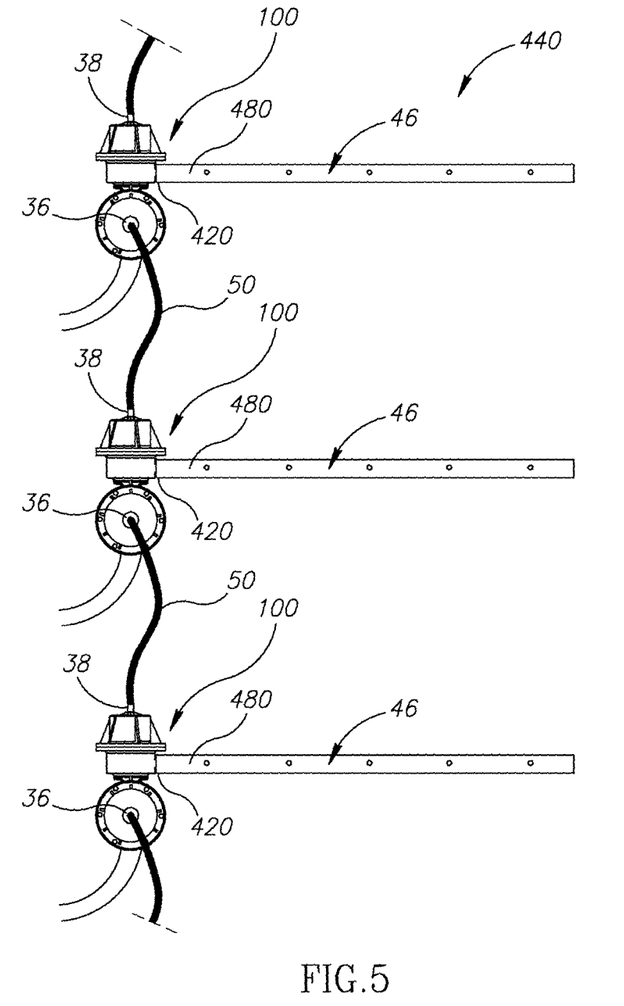
FIG. 5 schematically shows another possible form of an irrigation system including valve apparatuses in accordance with an embodiment of the present invention.

As seen in FIG. 5, system 440 also includes irrigation lines 46 however here the upper ends 480 of lines are connected to outlets 420 of the apparatuses 100. Starting from a position where the valve apparatuses 100 are each in an initial first state generally similar to that illustrated in FIG. 3A, and then triggering e.g. the lowermost apparatus to shift towards its second state will trigger a sequence of events generally similar to that descried above with respect to system 44, however with the "leaping" action urging start of irrigation of subsequent irrigation lines (and not flushing) By appropriately designing and configuring apparatus 100 to have e.g. a larger chamber 33 and/or a lower flow rate device 34—a suitable time spans during which each line 46 in system 440 may remain open to perform e.g. drip irrigation may be achieved. It is noted that 'leaping' between other irrigation operations, other than drip irrigation, may also be envisioned in accordance with various embodiments of the present invention such as sprinkling (etc.).

Figure 6:
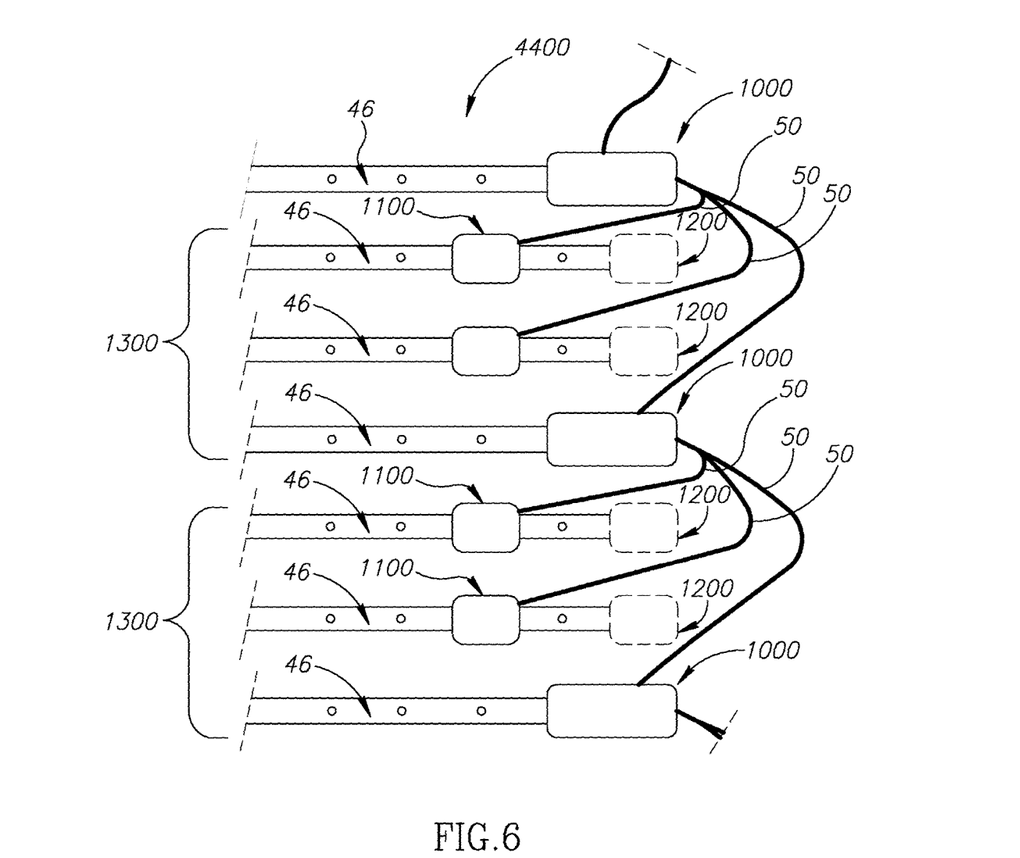
FIG. 6 schematically shows yet another possible form of an irrigation system including valve apparatuses in accordance with an embodiment of the present invention.

Attention is drawn to FIG. 6 illustrating an irrigation system 4400 divided into sections 1300, each including a plurality of drip irrigation lines 46 (here optionally three). In accordance with one form of the present invention, one line of each section 1300 includes (and is associated with) an embodiment of a valve apparatus 1000 according to the present invention here at its end, which in response to an incoming command opens liquid flow downstream to (here) start flushing of the line and when (or after) closing to end flushing transmits an outgoing pressure command.

The "other" (here) two lines 46 of each section 1300 include at the end of each line possibly a "non-outgoing" flushing valve that is adapted upon receipt of an incoming pressure command to start a flushing action, which after a certain period of time ends, however without transmitting an outgoing command. In a non-binding example, such "non-outgoing" flushing valve may be devised by positioning towards an end of a drip line a valve 1100 according to e.g.

WO2012131503 and then a valve 1200 according to e.g. U.S. Pat. No. 5,535,778 (the disclosures of which are incorporated herein by reference) with possibly a segment of a drip line in-between. Valve 1100 is adapted to open upon receipt of an incoming command, a path for liquid downstream and valve 1200 when exposed to pressurized liquid from upstream is adapted to initially allow liquid a path to be discharged downstream (here to be flushed to the ambient environment) while gradually closing the path until shutting and terminating the flushing action.

In another example (not shown), instead of the above combination of valves 1100 and 1200, a valve device similar to a valve apparatus 1000 of an embodiment of the invention may be placed at the ends of each one of the above named "other" lines 46 of a section 1300. Such valve device when used in association to these "other" lines may be fitted with a flow restricting element, such as a drip emitter, at outlet port 38 for leading fluid out of chamber 33. Such flow restricting element preferably permits a trickle flow of fluid to exit chamber 33 at a rate lower than the rate of fluid entering chamber 33 via, e.g., flow device 34. By this, it will be possible to build pressure in chamber 33 of such a device to facilitate the closing and termination of its flushing action, while permitting later the pressure in chamber 33 to gradually be released also via the flow restricting element at its outlet port 38 after e.g. cessation of an irrigation cycle in system 4400.

In accordance with one aspect of the present invention, system 4400 enables flushing of sections 1300 of the system in sequence each time "leaping" the flushing action to a subsequent given section 1300. In the present example, this may be performed by providing e.g. a first incoming command to the first uppermost apparatus 1000 from any means such as an adjacent section 1300 (not seen) or an adjacent pipe (not shown) including e.g. a valve (also not shown) that may be activated to open and provide into the inlet port of this here uppermost apparatus 1000 pressurized liquid or fluid (e.g. a pressurized gas and/or air) constituting a first incoming command.

Once activated to open, this apparatus 1000 may be triggered to shift from an initial first state generally similar to that seen in FIG. 3A towards a second state generally similar to that seen in FIG. 3B in which liquid is released to flow downstream. In the second state, apparatus 1000 facilitates here a flushing action of the uppermost irrigation line 46 of system 4400 that may terminate when apparatus 1000 reaches a terminal state generally similar to that illustrated in FIG. 3C where via its outlet port a "split" outgoing command may be transmitted via a plurality of command lines 50 (here three).

Command lines 50 in system 4400 lead the "split" outgoing command from apparatus 1000 to inlet ports of the valves in the first uppermost illustrated section 1300 in this example. In the example shown, the two first command lines 50 lead the outgoing command to valves 1100 of the section 1300 that trigger these valves to open and perform flushing actions of their lines via valves 1200 until the valves 1200 shut. The (here) third command line 50 leads the outgoing command into a valve apparatus 1000 according to an embodiment of the present invention that is included in section 1300. Here a flushing action of this third line 46 of the section (associated to apparatus 1000) will start that may end with termination of flushing and with the formation of a subsequent outgoing command that is "split" and communicated to the subsequent section 1300 (here illustrated) below to start flushing of that section.

This "leaping" action between sections may continue until all sections 1300 of the system 4400 are flushed and a drip irrigation cycle (devoid of flushing) begins. Once the irrigation cycle ends and the building of pressure downstream into the lines 46 of system 4400 has e.g. halted, the pressure in the lines 46 gradually decreases due to remaining liquid in the lines being emitted via the drip emitters to the outside.

The valves 1100, 1200 of each section 1300 at end of an irrigation cycle may return back to their initial states ready to be activated to perform flushing, as well as the embodiment of valve 1000 of each section that also returns to an initial state generally similar to that seen in FIG. 3A. A system 4400 reaching this state is thus prepared for a subsequent start of an irrigation cycle where "leaping" of flushing between its sections 1300 may again be performed upon e.g. activation of an incoming command into e.g. here the uppermost first apparatus 1000 seen at the top of FIG. 6.

It should be noted that to each valve, be it a valve apparatus 10, 100, 1000 according to an embodiment of the present invention and/or a valve apparatus such as that combined from vales 1100, 1200—one or more irrigation devices (such as drip lines 46) may be associated. To embodiments of apparatuses according to the present invention, such one or more irrigation devices may either be associated entering (i.e. feeding liquid into) as seen e.g. in system 440 or may be associated leading out (i.e. communicating liquid down stream) as seen e.g. in systems 44 and 4400.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

The invention claimed is:

1. An irrigation system comprising:
   first and second drip irrigation lines, each having a downstream end;
   a first valve apparatus located at the downstream end of the first drip irrigation line; and
   a second valve apparatus located at the downstream end of the second drip irrigation line; wherein:
   each valve apparatus comprises:
     an inlet;
     an outlet;
     a command fluid inlet port; and
     a command fluid outlet port;
   each valve apparatus is adapted to open in response to an incoming command received at its command fluid inlet port and subsequently close and transmit an outgoing command via its command fluid outlet port, and
   the command fluid outlet port of the first valve apparatus is connected to the command fluid inlet port of the second valve apparatus such that the outgoing command of the first valve apparatus forms the incoming command of the second valve apparatus.

2. The irrigation system of claim 1, wherein each valve apparatus has:
   an initial closed state in which no incoming command is received at the command fluid inlet port and liquid is not allowed to flow into the valve apparatus and downstream via the outlet, an open state in which an incoming command is received at the command fluid inlet port and liquid is allowed to flow into the valve apparatus and downstream via the outlet, and a terminal closed state in which an incoming command is received at the command fluid inlet port and liquid is not allowed to flow into the valve apparatus and downstream via the outlet.

3. The irrigation system of claim 2, wherein:

each valve apparatus has its inlet in fluid communication with an upstream section of the system, and each valve apparatus after assuming the terminal closed state remains in the terminal closed state as long as the upstream section provides pressurized liquid at that valve's inlet.

4. The irrigation system of claim 3, wherein termination of the pressurized liquid at its inlet allows each valve apparatus to return to the initial closed state from the terminal closed state.

5. The irrigation system of claim 4, wherein each valve apparatus is adapted to:

receive an incoming command to form the open state and then remain in the terminal closed state while the incoming command is still active.

6. The irrigation system according to claim 1, wherein each valve apparatus comprises:

a first valve member connected to the inlet, the first valve member having the command fluid inlet port;

a second valve member connected to the first valve member via an entry, the second valve member comprising a partition membrane partitioning the second valve member into a first chamber and a second chamber, wherein the outlet is connected to the first chamber of the second valve member; and an aperture in the partition membrane, the aperture establishing fluid communication between the first chamber and the second chamber;

wherein:

in a first state of the valve apparatus:

no incoming command signal is present at the command fluid inlet port; and fluid is not allowed to flow between the inlet and the outlet;

in a second state of the valve apparatus:

an incoming command signal is present at the command fluid inlet port;

fluid is allowed to enter at the inlet and exit at the outlet, after passing through the first valve member, the entry and the first chamber of the second valve member; and fluid entering at the inlet is also allowed to enter the second chamber, via the aperture in the partition membrane; and in a third state of the valve apparatus:

the partition membrane is in a flexed position, thereby preventing fluid from exiting the valve apparatus via the outlet.

7. The irrigation system according to claim 6, wherein, in the third state of the valve apparatus, the incoming command signal is present at the command fluid inlet port.

8. The irrigation system according to claim 6, wherein the first valve member comprises a first membrane configured to be flexed from an initially closed position to a subsequent open position, when the incoming command signal is present at the command fluid inlet port.

9. The irrigation system according to claim 8, wherein, in the third state of the valve apparatus, the first membrane is in the open position and the partition membrane is in the flexed position.

10. The irrigation system according to claim 6, wherein the second valve member further comprises the command fluid outlet port, which is connected with the second chamber of the second valve member for transmitting an outgoing fluid command signal.

* * * * *